United States Patent
Mott et al.

(10) Patent No.: US 8,060,283 B2
(45) Date of Patent: Nov. 15, 2011

(54) METHOD AND SYSTEM FOR CONTROLLING THE LOADING OF A CONTAINER ASSOCIATED WITH A VEHICLE

(75) Inventors: Cameron Ray Mott, Anaheim, CA (US); Andrew Karl Wilhem Rekow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 1065 days.

(21) Appl. No.: 11/872,097

(22) Filed: Oct. 15, 2007

(65) Prior Publication Data

US 2009/0099775 A1   Apr. 16, 2009

(51) Int. Cl.
*G06F 19/00* (2006.01)
(52) U.S. Cl. ......... 701/50; 701/300; 477/40; 348/14.08; 348/211.99; 104/66; 246/122 R
(58) Field of Classification Search .................... 701/50, 701/300; 477/40; 220/DIG. 33; 246/122 R; 104/66; 348/15, 14.08, 211.99
See application file for complete search history.

(56) References Cited

U.S. PATENT DOCUMENTS

| | | | | |
|---|---|---|---|---|
| 4,614,426 A | * | 9/1986 | Baxter et al. | 356/3.13 |
| 5,331,561 A | * | 7/1994 | Barrett et al. | 701/205 |
| 5,977,906 A | * | 11/1999 | Ameen et al. | 342/174 |
| 6,121,919 A | * | 9/2000 | Ameen et al. | 342/174 |
| 6,167,331 A | * | 12/2000 | Matsumoto et al. | 701/23 |
| 6,553,288 B2 | * | 4/2003 | Taguchi et al. | 701/23 |
| 6,587,772 B2 | | 7/2003 | Behnke | |
| 6,682,416 B2 | | 1/2004 | Behnke et al. | |
| 7,168,560 B2 | * | 1/2007 | Finetti et al. | 206/390 |
| 7,302,321 B2 | * | 11/2007 | Suzuki et al. | 701/23 |
| 7,613,563 B2 | * | 11/2009 | Haegebarth et al. | 701/117 |
| 2004/0260439 A1 | * | 12/2004 | Endo et al. | 701/36 |
| 2006/0150584 A1 | * | 7/2006 | Weiss | 54/10 |
| 2007/0119688 A1 | * | 5/2007 | Brandt | 198/668 |
| 2007/0273390 A1 | * | 11/2007 | Champion et al. | 324/639 |
| 2008/0078587 A1 | * | 4/2008 | Johansen et al. | 177/136 |
| 2009/0079839 A1 | * | 3/2009 | Fischer et al. | 348/218.1 |
| 2009/0143923 A1 | * | 6/2009 | Breed | 701/1 |
| 2010/0049374 A1 | * | 2/2010 | Ferrin et al. | 701/1 |

* cited by examiner

*Primary Examiner* — James Trammell
*Assistant Examiner* — McDieunel Marc

(57) ABSTRACT

A leader location-determining receiver determines a leader location of a lead vehicle. A follower location-determining receiver determines a follower location of a follower vehicle, which has a container for storing a material. A data processor or position module calculates an observed relative position between the lead vehicle and the follower vehicle. Target relative positions are established between the lead vehicle and the follower vehicle. A data processor or selector selects a preferential one of the established target positions. A data processor or adjuster adjusts the observed relative position of the follower vehicle to achieve the selected preferential one of the established target positions.

22 Claims, 6 Drawing Sheets

METHOD AND SYSTEM FOR CONTROLLING THE LOADING OF A CONTAINER ASSOCIATED WITH A VEHICLE

FIELD OF THE INVENTION

This invention relates to method and system for controlling the loading of container associated with a vehicle.

BACKGROUND OF THE INVENTION

A lead vehicle may harvest or collect material (e.g., harvested crop, grain, ore, mined materials, or other material) that is loaded into a follower vehicle that follows the lead vehicle. If the lead vehicle and the follower vehicle are manned and both moving, the operators may attempt to coordinate the relative positions of the vehicles to facilitate loading of a container associated with a follower vehicle. However, it may prove extremely difficult to coordinate the relative positions of the moving vehicles with accuracy because of potential variations in the positions of each vehicle, for instance. Accordingly, there is need to coordinate automatically the speed and position of the lead vehicle and a follower vehicle.

SUMMARY OF THE INVENTION

In accordance with one embodiment of the invention, a method and system for controlling the loading of a container associated with a vehicle comprises a leader location-determining receiver for determining a leader location of a lead vehicle. A follower location-determining receiver determines a follower location of a follower vehicle. The follower vehicle has a container for storing a material. A data processor or position module calculates an observed relative position between the lead vehicle and the follower vehicle. Target relative positions are established between the lead vehicle and the follower vehicle, where the target relative positions include at least a first target relative position and a second target relative position spatially separated from the first target relative position. A data processor or selector is capable of selecting a preferential one of the established target positions. A data processor or adjuster adjusts the observed relative position of at least one of the vehicles (e.g., follower vehicle) to achieve the selected preferential one of the established target positions.

BRIEF DESCRIPTION OF THE DRAWINGS

FIG. 4 B shows a top view of a leader vehicle (e.g., a combine) and a follower vehicle (e.g., grain cart) in a second illustrative relative position.

FIG. 4 C shows a top view of a leader vehicle (e.g., a combine) and a follower vehicle (e.g., grain cart) in a third illustrative relative position.

DESCRIPTION OF THE PREFERRED EMBODIMENT

Figure 1:
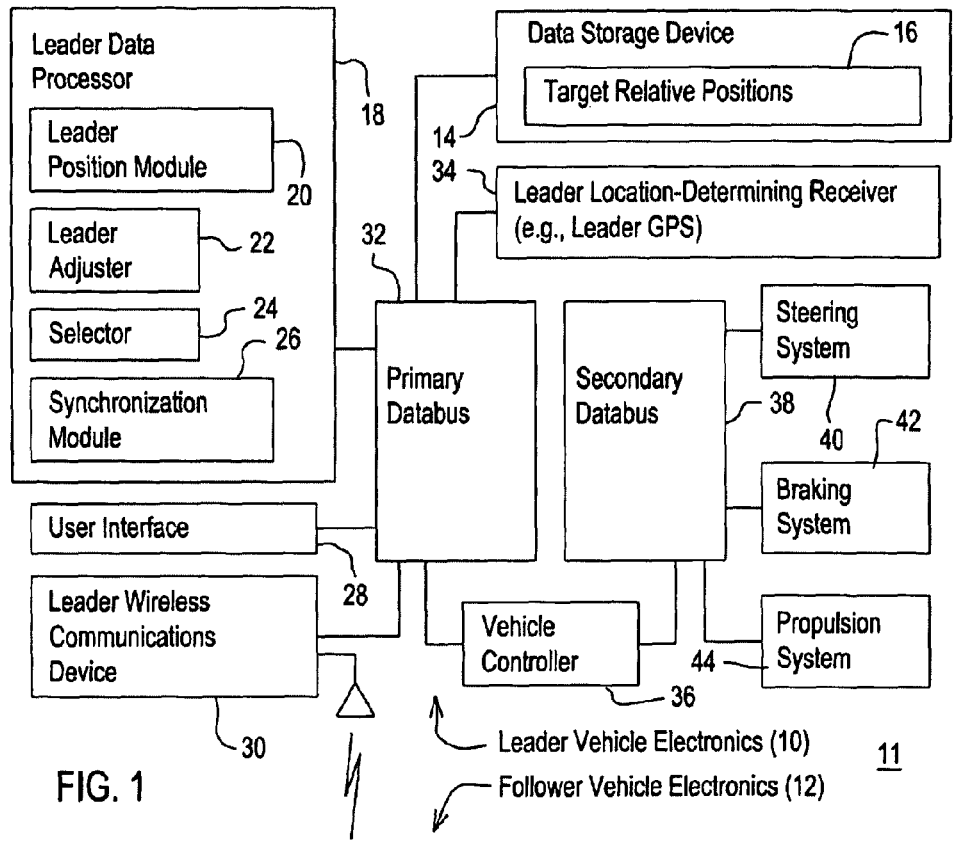
FIG. 1 is a block diagram of one embodiment of a system for controlling the loading of a container associated with a vehicle.
Figure 1:
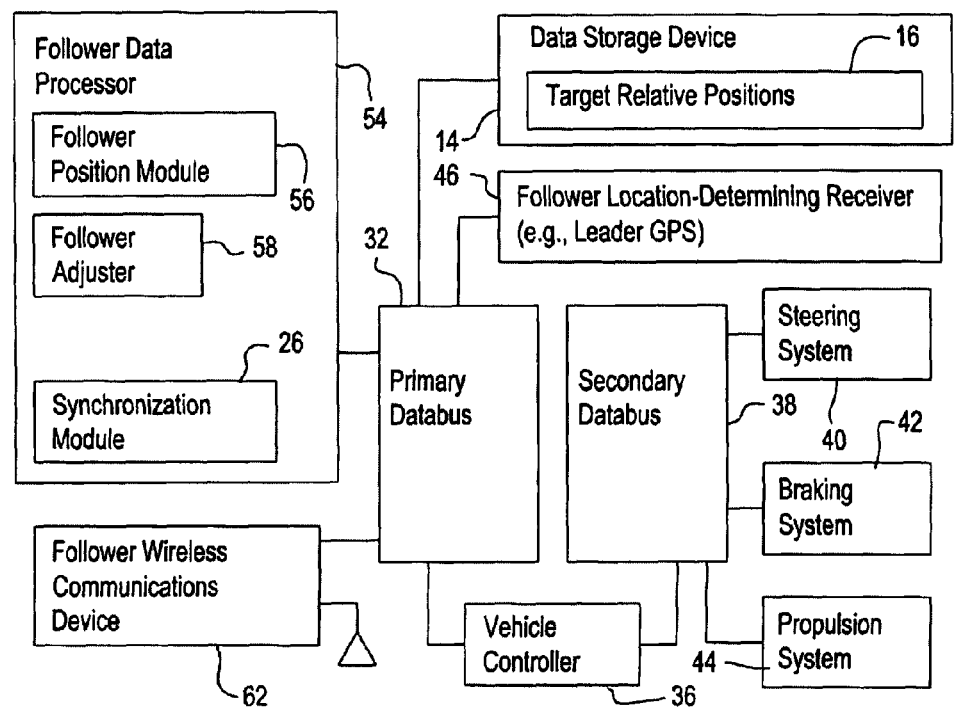

FIG. 1 illustrates one possible embodiment for the system 11 for controlling the loading of a container associated with a follower vehicle. A lead vehicle or leader vehicle may provide a supply of a material for deposit or storage in the container of the follower vehicle. The leader vehicle may establish a path and velocity (e.g., speed and heading) that is generally tracked or followed by the follower vehicle, at least for some operational duration.

The follower vehicle may be associated with one or more containers for holding or storing material (e.g., grain or biomass feedstock). In one example, the follower vehicle may be equipped with distinct containers with separate level indicators or fullness indicators to indicate a level of fullness of the container with material. In another example, the follower vehicle is associated with a single container has different zones, sections, compartments, sub-containers, or subdivisions, where each zone, section, compartment, sub-container or subdivision is associated with a level sensor or fullness sensor for the material. As used herein, volume or zone shall refer to one or more of the following: (1) a portion or section of a container, regardless of whether it is separated from any other section of the container by a partition, wall, or retainer, or chamber; and (2) one container within a group of containers associated with the follower vehicle.

The system 11 generally comprises leader vehicle electronics 10 that communicate with follower vehicle electronics 12 via one or more wireless communications devices (30, 62). For example, the leader wireless communications device 30 and the follower wireless communications device 62 support communications between the leader vehicle electronics 10 and the follower vehicle electronics 12. Leader vehicle electronics 10 are housed in, mounted on, or carried by the lead vehicle or leader vehicle. Follower vehicle electronics 12 are housed in, mounted on, or carried by the follower vehicle.

The leader vehicle electronics 10 comprises a leader data processor 18, a user interface 28, a data storage device 14, leader location-determining receiver 34, a leader wireless communications device 30 and a vehicle controller 36 coupled to a primary databus 32. In turn, the vehicle controller 36 is coupled to a secondary databus 38. The vehicle controller 36 is capable of communicating, directly or indirectly, with one or more following components (e.g., via the secondary databus 38) the steering system 40, braking system 42, and propulsion system 44.

The follower vehicle electronics 12 comprises a follower data processor 54, a data storage device 14, follower location-determining receiver, a follower wireless communications device 62 and a vehicle controller 36 coupled to a primary databus 32. In turn, the vehicle controller 36 is coupled to a secondary databus 38. The vehicle controller 36 is capable of communicating with, directly or indirectly, one or more following components: the steering system 40, braking system 42, and propulsion system 44.

In one embodiment, the leader data processor 18 further comprises a leader position module 20, a leader adjuster 22, a selector 24, and a synchronization module 26, whereas the follower data processor 54 comprises a follower position module 56, a follower adjuster 58, and a synchronization module 26.

In the leader data processor 18, the selector 24 may support a user's manual selection or the leader data processor's automated selection of one or more relative positions (e.g., preset relative positions) between the leader vehicle and the follower vehicle. For automated selection in accordance with one illustrative configuration, the selector 24 may comprise a timer that supports maintenance of a certain relative position between the vehicles for a corresponding maximum time period prior to shifting a next relative position between the vehicles. However, other configurations are possible for automated selection as more fully explained later herein.

The user interface 28 may comprise a keyboard, a keypad, a screen, a touch screen a display, a pointing device (e.g., an electronic mouse or trackball), a switch, a console, a voice recognition device, another device for inputting data from a user or outputting data to a user, or any combination of the foregoing items.

The steering system 40 comprises a hydraulic steering system, an electro-hydraulic steering system, an electromechanical steering system, an electromechanical actuator, an electrical steering system, a drive-by-wire steering system or another steering system with an electrical or electronic control interface for communicating over the secondary databus 38 or otherwise communicating with the vehicle controller 36. In one embodiment, the electronic control interface may comprise a sensor for detecting a position of a hydraulic cylinder of the steering system 40 and an actuator for controlling the position of the hydraulic cylinder or other member of the steering system 40 in response to commands from the vehicle controller 36. Although the steering system 40 may use digital messages (e.g., logic level signals) to control steering, in an alternate embodiment the steering system 40 may use analog signals, particularly if the steering system 40 is configured to directly communicate with the vehicle controller 36.

The braking system 42 comprises a hydraulic braking system, an electro-hydraulic braking system, an electromechanical braking system, an electromechanical actuator, an electrical braking system, a brake-by-wire braking system or another braking system with an electrical or electronic control interface for communicating over the secondary databus 38 or otherwise communicating with the vehicle controller 36. In one embodiment, the electronic control interface may comprise a sensor for detecting a position of a hydraulic cylinder of the braking system 42 and an actuator for controlling or modulating the position of the hydraulic cylinder or other member of the braking system 42 in response to commands from the vehicle controller 36. Although the braking system 42 may use digital messages (e.g., logic level signals) to control braking, in an alternate embodiment the braking system 42 may use analog signals, particularly if the braking system 42 is configured to directly communicate with the vehicle controller 36.

In one embodiment, the propulsion system 44 comprises the combination of an engine controller and an internal combustion engine. The engine controller may control a throttle setting, carburetor, fuel injection system, fuel-metering system or air-metering system, or other fuel delivery system for the internal combustion engine, for example.

In another embodiment, the propulsion system 44 comprises an electric motor, a drive motor, an alternating current motor, an induction motor, a permanent magnet motor, a direct current motor, or another suitable motor for propelling a vehicle. Further, the propulsion system 44 may comprise a motor controller (e.g., an inverter, chopper, wave generator, variable frequency oscillator, variable current supply, or variable voltage supply) for controlling the velocity, torque, and direction of rotation of the motor shaft of the electric motor. In yet another embodiment, the propulsion system 44 comprises a hybrid drive system, a parallel hybrid, system, or a series hybrid system, in which at least one of an electric motor and an internal combustion engine can propel the vehicle. For example, in a parallel hybrid system, the electric motor, the internal combustion engine or both may apply power to one or more wheels (or tracks) of the vehicle. For a series hybrid system, the electric motor typically provides power to one or more wheels (or tracks) of the vehicle.

The leader location-determining receiver 34 comprises a location-determining receiver, such as a Global Positioning System receiver, a Global Positioning System receiver with differential correction, or the like. A leader antenna of leader location-determining receiver 34 is mounted at a lead reference position (e.g., 401 in FIG. 4A) on the leader vehicle (e.g., 400 of FIG. 4A).

The follower location-determining receiver 46 comprises a location-determining receiver, such as a Global Positioning System receiver, a Global Positioning System receiver with differential correction, or the like. A follower antenna of follower location-determining receiver 46 is mounted at a follower reference, position (e.g., 403 in FIG. 4A) on the follower vehicle (e.g., 405 of FIG. 4A).

During operation, the leader location-determining receiver 34 determines a leader location of a lead vehicle or a lead reference point associated with or on the lead vehicle. A follower location-determining receiver 46 determines a follower location of a follower vehicle or the follower reference point associated with or on the follower vehicle. The follower vehicle is associated with one or more containers, volumes or zones for storing a material. Each container may be organized, divided or compartmentalized into one or more distinct volumes or zones. The material may comprise a harvested crop, grain, oilseed, biofuel feedstock, fiber, an agricultural product, plant material, a fruit, a vegetable, peat moss, ore, or a mined material, for example.

A data processor (18 or 54) or position module (20 or 56) calculates an observed relative position between the lead vehicle and the follower vehicle. Here, the data processor may refer to the leader data processor 18, the follower data processor 54, or both. Similarly, here the position module may refer to the leader position module 20, the follower position module 56, or both.

The data processor manages data storage and retrieval of target relative positions 16 stored in the data storage device 14. Target relative positions 16 are established between the lead vehicle and the follower vehicle, where the target relative positions 16 include at least a first target relative position and a second target relative position spatially separated from the first target relative position. Each relative position may be defined as a distance and angular bearing between the leader reference point and the follower reference point. For example, each relative position may be defined by a distance between the leader reference point and the follower reference point; and an angular bearing with reference to the leader reference point. Each relative position may have a tolerance or range with respect to the distance and the angular bearing.

A data processor or selector 24 selects a preferential one of the established target positions 16. A data processor (18 or 54) or adjuster (22 or 58) adjusts the observed relative position of the follower vehicle to achieve the selected preferential one of the established target positions. The selector 24 may support a user's manual selection or the leader data processor's automated selection of one or more relative target positions (e.g., preset relative target positions) between the leader vehicle and the follower vehicle. For automated selection, the selector 24 may comprise a timer that supports maintenance of a certain relative positions between the vehicles for a corresponding maximum time period prior to shifting a next relative position between the vehicles.

Figure 2:
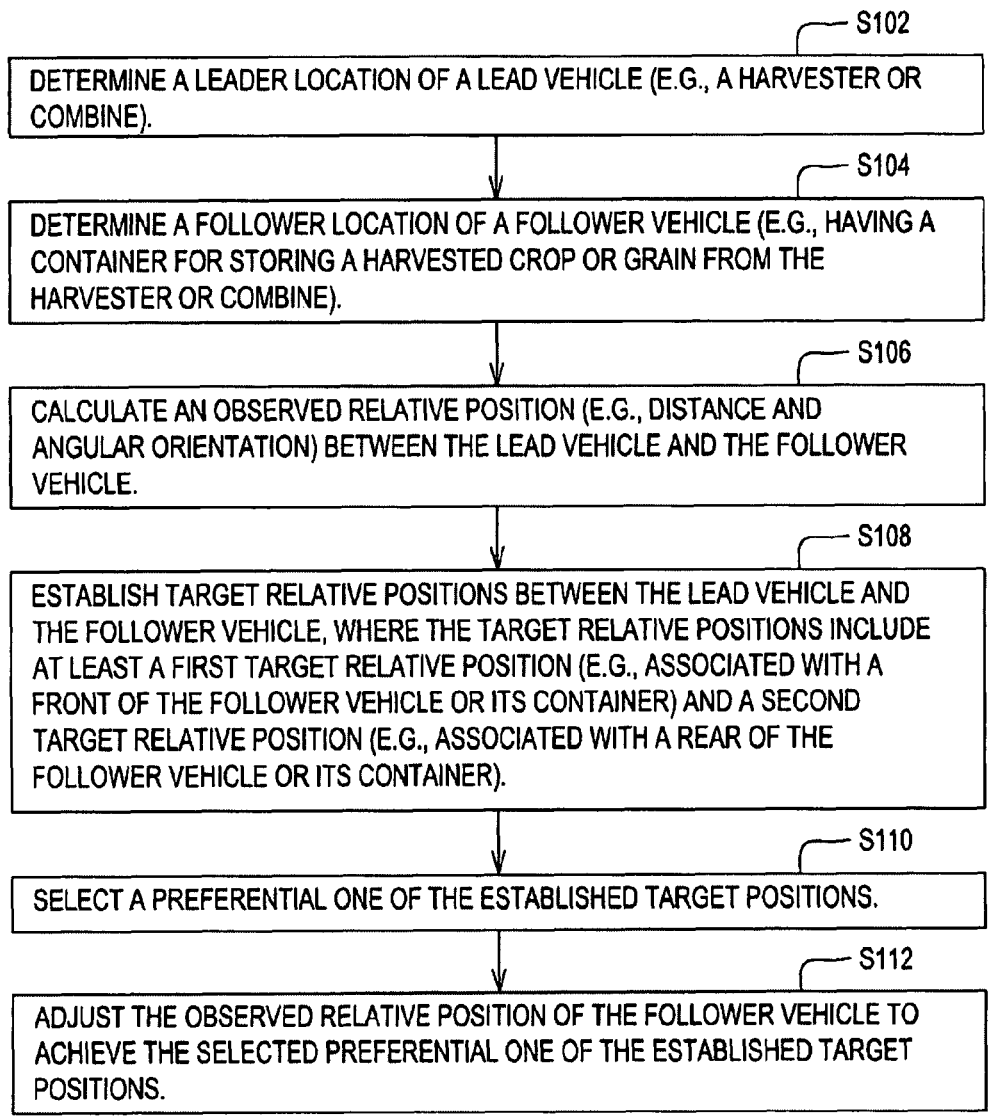
FIG. 2 is a flow chart of one embodiment of a method for controlling the loading of a container associated with the vehicle.

FIG. 2 illustrates a method for controlling the loading of a container or containers associated with the follower vehicle. The method of FIG. 2 may be carried by using the system of FIG. 1, FIG. 4, FIG. 5, or another system within the scope of the disclosure. The method of FIG. 2 begins in step S102.

In step S102, a leader location-determining receiver 34 determines a leader location of a lead vehicle (e.g., a harvester or a combine). For example, the leader location-determining receiver 34 may determine the first coordinates of the lead vehicle or a leader antenna associated therewith.

In step S104, a follower location-determining receiver determines a follower location of a follower vehicle (e.g., having a container for storing a harvested crop or grain from the harvester or combine). For example, the leader location-determining receiver 34 may determine the second coordinates of the follower vehicle or a follower antenna associated therewith.

In step S106, a leader position module 20, a follower position module 56, or both calculate an observed relative position (e.g., distance and angular orientation) between the lead vehicle and the follower vehicle. The observed relative position may represent the difference between the first coordinates and the second coordinates of step S102 and step S104, respectively. For example, the position module or data processor calculates a distance and angle between a lead reference point (e.g., 401 in FIG. 4A) and a follower reference point (e.g., 403 in FIG. 4A), where the lead reference point may be associated with the lead antenna of the leader location-determining receiver 34 and wherein the follower reference point may be associated with the follower antenna of the follower location-determining receiver 46. The synchronization module 26 or modules may be used to synchronize, reconcile, or align a first observed relative position determined by the leader position module 20 and a second observed relative position determined by the follower position module 56. In a first example, the synchronization module 26 may average the first observed relative position and the second observed relative position to determine an aggregate relative position for a given time interval. In a second example, the synchronization module 26 may use the latest or most recent of the first observed relative position and the second observed relative position as the aggregate relative position for a given time interval. In a third example, the synchronization module 26 may use the observed relevant position associated with the highest received signal quality (e.g., low bit error rate or frame error rates) for one or more received terrestrial or satellite signals.

In step S108, the data processor (18 or 54) establishes target relative positions 16 between the lead vehicle and the follower vehicle, where the target relative positions 16 include at least a first target relative position and a second target relative position. The target relative positions may comprise preset positions that are defined with reference to reference points on or associated with the lead vehicle and the follower vehicle. In one example, the first target relative position is expressed as a first distance ($D_1$) and a first angle ($\theta_1$) with respect to a leader reference point of the leader vehicle and a follower reference point of the follower vehicle; the first target relative position aligned such that a chute or conduit of the leader vehicle is aligned with a first volume or first zone of the container of the follower vehicle. In another example, the second target relative position is expressed as a second distance ($D_2$) and a second angle ($\theta_2$) with respect to a leader reference point of the leader vehicle and a follower reference point of the follower vehicle; the second target relative position aligned such that a chute or conduit of the leader vehicle is aligned with a second volume or second zone of the container of the follower vehicle. In yet another example, the third target relative position is expressed as a third distance ($D_3$) and a third angle ($\theta_3$) with respect to a leader reference point of the leader vehicle and a follower reference point of the follower vehicle; the third target relative position aligned such that a chute or conduit of the leader vehicle is aligned with a third volume or third zone of the container of the follower vehicle.

The data processor (18 or 54) may retrieve the established target relative positions 16 from a data storage device 14. In one embodiment, the established relative target positions 16 may be established via the user interface 28. The established target positions may depend on the physical dimensions of the lead vehicle and the follower vehicle, for instance. In one embodiment, the established target positions represent factory settings or preprogrammed settings associated with a combine or harvester as the lead vehicle and with a grain cart as the follower vehicle.

In step S110, a selector 24 or data processor (18 or 54) selects a preferential one of the established target positions. The selection process of step S110 may be carried out in accordance with various-techniques, which may be applied alternately or cumulatively. Under a first technique, the selector 24 may support a user's manual selection of one or more relative target positions (e.g., preset relative target positions) between the leader vehicle and the follower vehicle. Further, the user may have a preset button or switch corresponding to each preset position of vehicles. The positions may be identified verbally, numerically, alphanumerically or by a visual illustration (e.g., a top-down view of a grain cart indicating load front, load middle or load rear) of the follower vehicle.

Under a second technique, the selector 24 or data processor (18 or 54) may automatically select one or more relative target positions (e.g., preset relative target positions) between the leader vehicle and the follower vehicle based on timer data or sensor data.

Under a third technique, a timer may communicate with the selector 24 to support maintenance of a certain relative position between the vehicles for a corresponding maximum time period prior to shifting a next relative position between the vehicles. The maximum time period may be selected based on (1) a storage capacity of the container, volume or zone and (2) the yield rate of the material from the leader vehicle, the delivery rate, the flow rate, or the throughput rate of the material from the leader vehicle to the follower vehicle.

Under a fourth technique, a weight sensor (e.g., piezoelectric or piezoresistive sensor) may send a status signal to the selector 24 (or weighing module 61 of FIG. 5) to support shifting relative positions between the vehicles after achieving a certain minimum weight of material in a corresponding volume or area of the container of the follower vehicle. Under a fifth technique, a sensor may send a status signal to the selector 24 (or sensor processing module 161 of FIG. 6) to support shifting relative positions between the vehicles after achieving a certain height or quantity of material in a corresponding volume or area of the container of the follower vehicle.

Under a sixth technique, a weight sensor sends a sensor signal or status signal to the selector 24 (or weighing module 61 of FIG. 5) that indicates whether the minimum threshold weight is met or exceeded in one zone or volume of the container; the selector 24 shifts the position of the follower vehicle with respect to the leader vehicle from one zone or volume to another zone or volume. The selector 24 may shift from one zone to another until the zones or volumes associated with all other positions are full to a desired degree.

Under a seventh technique, an electromagnetic sensor sends a sensor signal or status signal to the selector 24 (or sensor processing module 161 of FIG. 5) that indicates whether the minimum threshold height or fullness level is met or exceeded in one zone or volume of the container; the selector 24 shifts the position of the follower vehicle with respect to the leader vehicle from one zone or volume (e.g., a full zone) to another zone or volume (e.g., a partially full or empty zone). The selector 24 may shift from one zone to another until the zones or volumes associated with all other positions are full to a desired degree. For the electromagnetic sensor, the material level or fullness of the zone or volume of the container is indicated where a reflection of the electromagnetic signal is not received for a minimum threshold time based on a material in a corresponding zone of the container blocking or attenuating the transmitted electromagnetic signal.

In step S112, an adjuster, a follower adjuster 58 or a leader adjuster 22 adjusts the observed relative position of the follower vehicle (with respect to the lead vehicle) to achieve the selected preferential one of the established target positions. For example, the adjuster adjusts the distance between the reference points (401, 403 of FIG. 4A) or the angular bearing (θ) between the reference points, (401, 403). The adjuster may adjust the actual relative positions of the vehicles to achieve the target relative distance and target angular bearing associated with a first relative target position, a second relative target position, and a third relative target position, or to achieve another orientation or offset (e.g., lateral offset and direction of travel offset) between the vehicles, where the location-determining receivers (34, 46) indicate that the actual relative positions deviate more than a maximum tolerance from the target relative positions (or target relative distance and target angular bearing).

Figure 3:
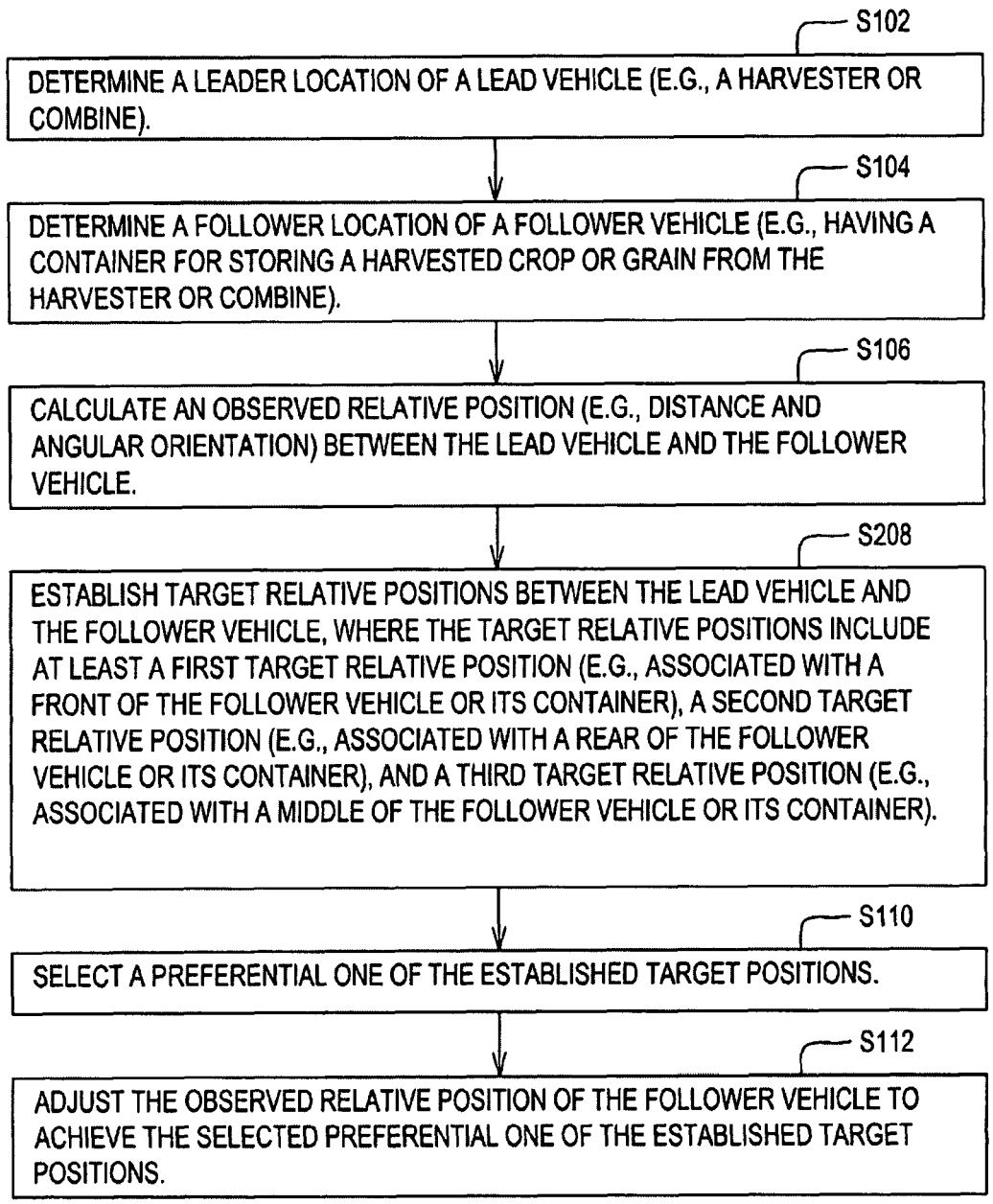
FIG. 3 is a flow chart of another embodiment of a method for controlling the loading of a container associated with the vehicle.

The method of FIG. 3 is similar to that of FIG. 2, except the method of FIG. 3 replaces step S108 with step S208. Like reference numbers in FIG. 2 and FIG. 3 indicate like steps or procedures.

Step S208 may follow step S108. In step S208, the data processor (18 or 54) establishes relative target positions between the lead vehicle and the follower vehicle, where the target relative positions 16 include at least a first target relative position (e.g., associated with a front of the follower vehicle or its container), a second target relative position (e.g., associated with a rear of the follower vehicle or its container), and a third target relative position (e.g., associated with a middle of the follower vehicle or its container). In one embodiment, the first target relative position is associated with a front portion of the container of the follower vehicle; the second target relative position is associated with a middle portion of the container of the follower vehicle; the third target relative position is associated with a rear portion of the container of the follower vehicle.

Figure 4A:
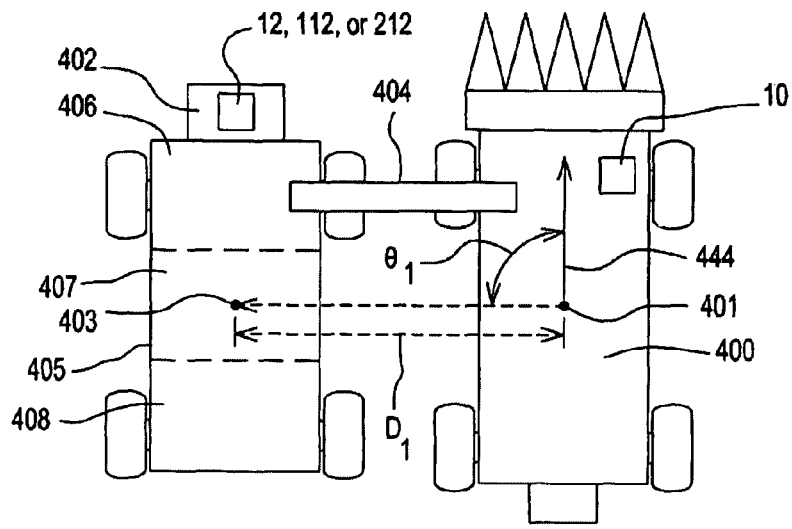
FIG. 4 A shows a top view of a leader vehicle (e.g., a combine) and a follower vehicle (e.g., grain cart) in a first illustrative relative position.
Figure 4B:
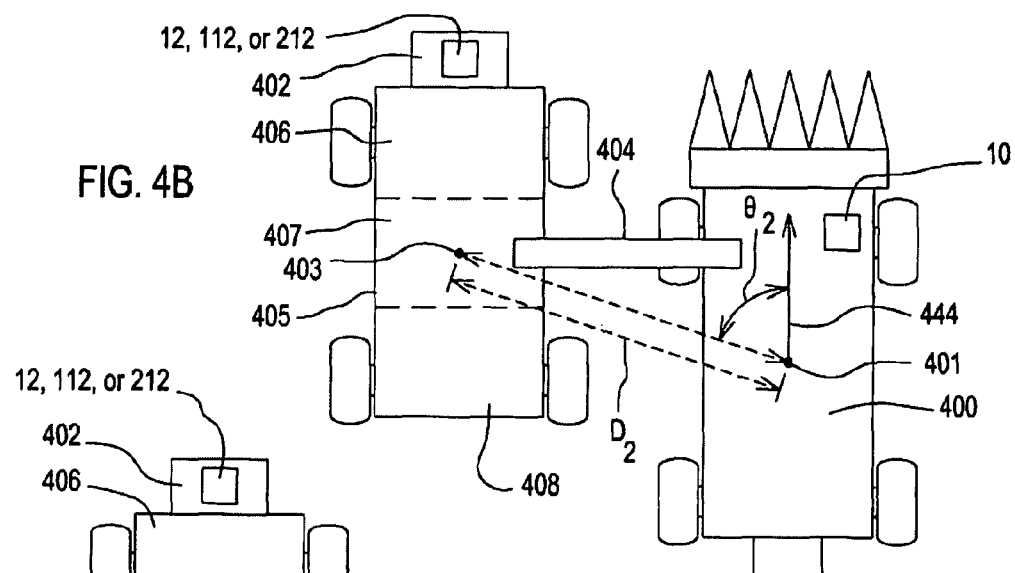
Figure 4C:
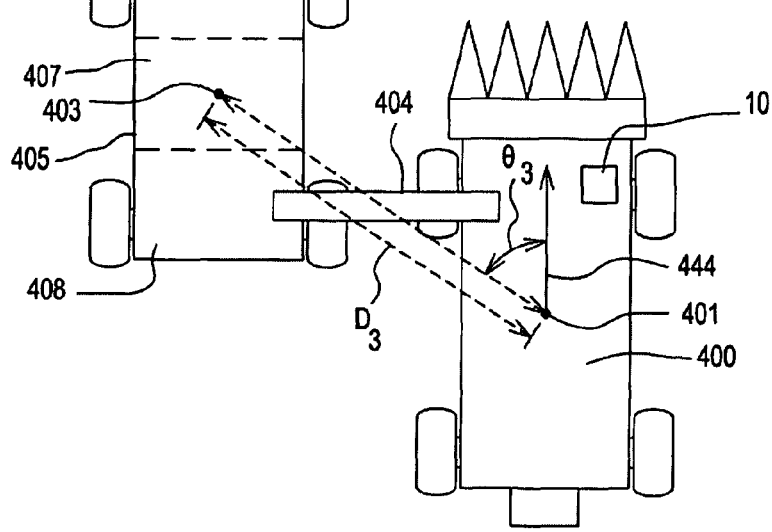

FIG. 4A through FIG. 4C show a leader vehicle 400 and a follower vehicle 405 in a various target relative positions 16. FIG. 4A shows the leader vehicle 400 and follower vehicle 405 in a first target relative, position. FIG. 4B shows the leader vehicle 400 and the follower vehicle 405 in a second target relative position. FIG. 4C shows the leader vehicle 400 and the follower vehicle 405 in a third target relative position. It is understood that target relative positions of FIG. 4A through FIG. 4C, inclusive, are merely representative of illustrative target positions; actual target positions may vary and other target positions fall within the scope of this disclosure and the claims. Each relative target position may be defined with reference to a leader reference point 400 and a follower reference point 403, where the leader reference point 400 coincides with a leader location-determining receiver 34 and where the follower reference point 403 coincides with a follower antenna of a follower location-determining receiver 46.

In FIG. 4A, the first target relative position may be expressed as a first distance ($D_1$) and a first angle ($\theta_1$) with respect to a leader reference point 401 (e.g., position of the leader antenna of the leader location-determining receiver 34). The distance $D_1$ is the shortest or linear distance between the leader reference point 401 and the follower reference point 403 (e.g., position of the follower antenna of the follower location-determining receiver 46). The first target relative position may be aligned such that a chute 404 or conduit of the leader vehicle 400 (e.g., combine) is aligned with a first volume or first zone 406 of a container of the follower vehicle 405 (e.g., grain cart). As shown, the first volume 406 is associated with a front portion of the container, where the front is defined with reference to the direction of travel 444 of the follower vehicle 405. Although the first volume 406 is distinct or separated from the second volume 407 by the dashed line in FIG. 4A, it is understood that the container may be divided into multiple bins, compartments or sub-containers for containing the material or the container may simply be a unitary container divided into different portions without any associated wall, barrier or physical division.

In FIG. 4B, the second target relative position may be expressed as a second distance ($D_2$) and a second angle ($\theta_2$) with respect to a leader reference point 401 (e.g., position of the leader antenna of the location-determining receiver). The distance $D_2$ is the shortest or linear distance between the leader reference point 401 and the follower reference point 403 (e.g., position of the leader antenna of the follower location-determining receiver 46). The second target relative position may be aligned such that a chute 404 or conduit of the leader vehicle 400 is aligned with a second volume 407 or second zone of a container of the follower vehicle 405. As shown, the second volume 407 is associated with an intermediate portion of the container, where the front is defined with reference to the direction of travel of the follower vehicle 405. Although the second volume 407 is distinct or separated from the first volume 406 and the third volume 408 by the dashed lines in FIG. 4B, it is understood that the container may be divided into multiple bins, compartments or sub-containers for containing the material or the container may simply be a unitary container divided into different portions without any associated wall, barrier or physical division.

In FIG. 4C, the third target relative position may be expressed as a third distance ($D_3$) and a third angle ($\theta_3$) with respect to a leader reference point 401 (e.g., position of the leader antenna of the location-determining receiver). The distance $D_2$ $D_3$ is the shortest or linear distance between the leader reference point 401 and the follower reference point 403 (e.g., position of the leader antenna of the follower location-determining receiver 46). The third target relative position may be aligned such that a chute 404 or conduit of the leader vehicle 400 is aligned with a third volume 408 or third zone of a container of the follower vehicle 405. As shown, the third volume 408 is associated with a rear portion of the container, where the front is defined with reference to the direction of travel of the follower vehicle 405. Although the third volume 408 is distinct or separated from the second volume 407 by the dashed line in FIG. 4C, it is understood that the container may be divided into multiple bins, compartments or sub-containers for containing the material or the container may simply be a unitary container divided into different portions without any associated wall, barrier or physical division.

Figure 5:
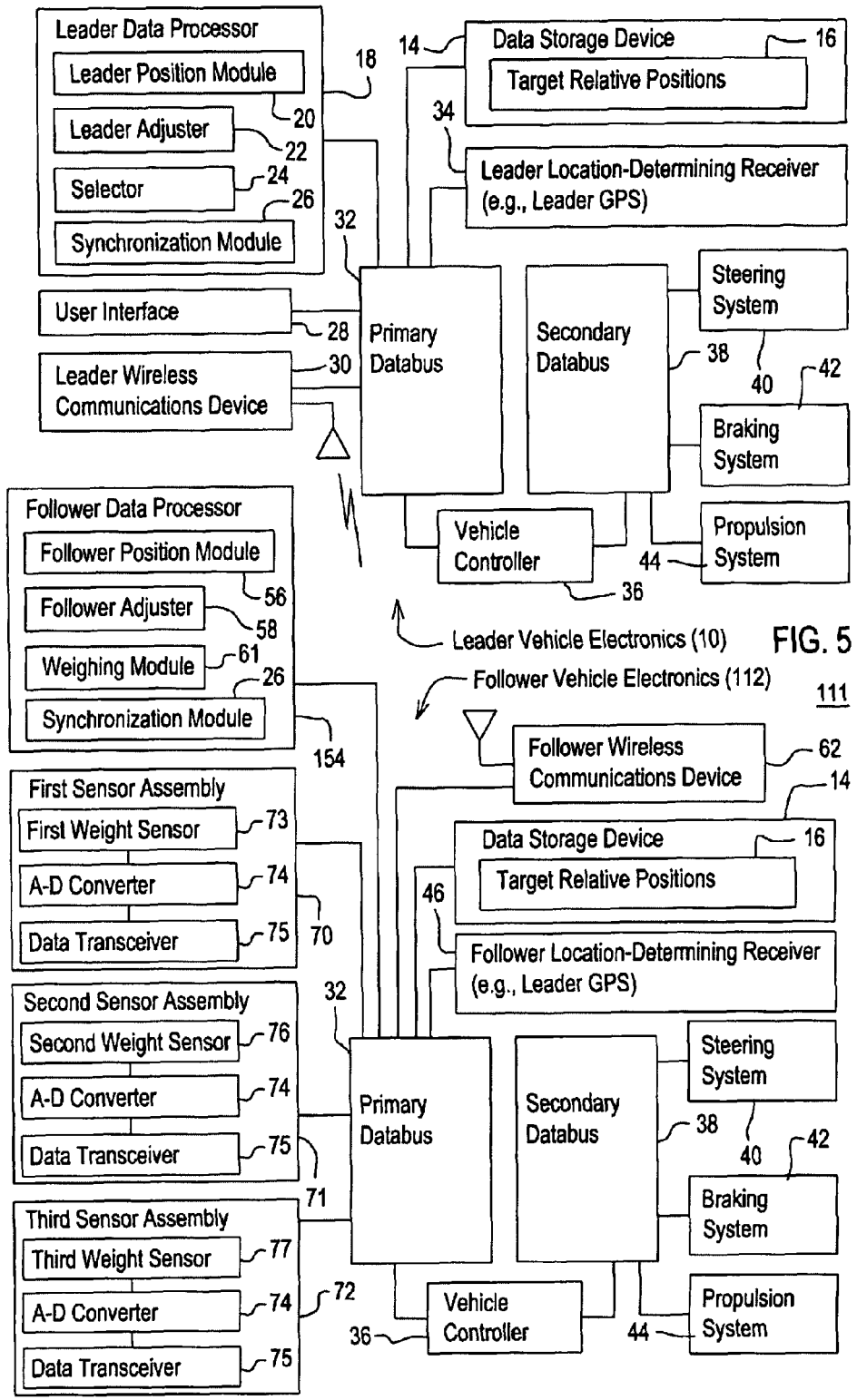
FIG. 5 is a block diagram of another embodiment of a system for controlling the loading of a container associated with a vehicle.

The system 111 of FIG. 5 is similar to the system 11 of FIG. 1, except the follower vehicle electronics 112 of FIG. 5 further comprises a first sensor assembly 70, a second sensor assembly 71 and a third sensor assembly 72 associated with a container or containers of the follower vehicle. In addition, the follower data processor 154 further comprises a weighing module 61.

Each sensor assembly (70, 71 and 72) comprises a piezoelectric sensor, a piezoresistive sensor or another weight sensor for detecting a weight associated with a material (e.g., grain, oilseed, harvested crop, fiber, cotton, or corn) stored or accumulated in a corresponding portion or zone of the container. For example, each weight sensor (73, 76 and 77) may be sandwiched between a bottom of the container and a pressure plate upon which the material in a certain zone or portion of the container rests. A piezoelectric sensor generates electrical energy or an electrical property in response to the application of pressure, force, or weight to the sensor. A piezoresistive sensor changes its electrical resistance in response to the application of pressure, force or weight. If the weighing module 61 determines that the weight or mass applied to, the weight sensor (70, 71 or 72) reaches or exceeds a threshold minimum weight, the corresponding zone or volume of the container may be regarded as full of the material or having a target level of material.

If the weight sensor (73, 76 or 77) provides an analog output as sensor data, the weight sensor may be, coupled to an analog-to-digital converter 74 (e.g., an AND converter). In turn, the analog-to-digital converter 74 may be coupled to a data transceiver 75 that is capable of transmitting or receiving a data message to the follower data processor 154 via the primary databus 32. A first sensor assembly 70 comprises a first weight sensor 73 coupled to an analog-to-digital converter 74, which is in turn coupled to a data transceiver 75. A second sensor assembly 71 comprises a second weight sensor 76 coupled to an analog-to-digital converter 74, which is in turn coupled to a data transceiver 75. A third sensor assembly 72 comprises a third weight sensor 77 coupled to an analog-to-digital converter 74, which is in turn coupled to a data transceiver 75.

Figure 6:
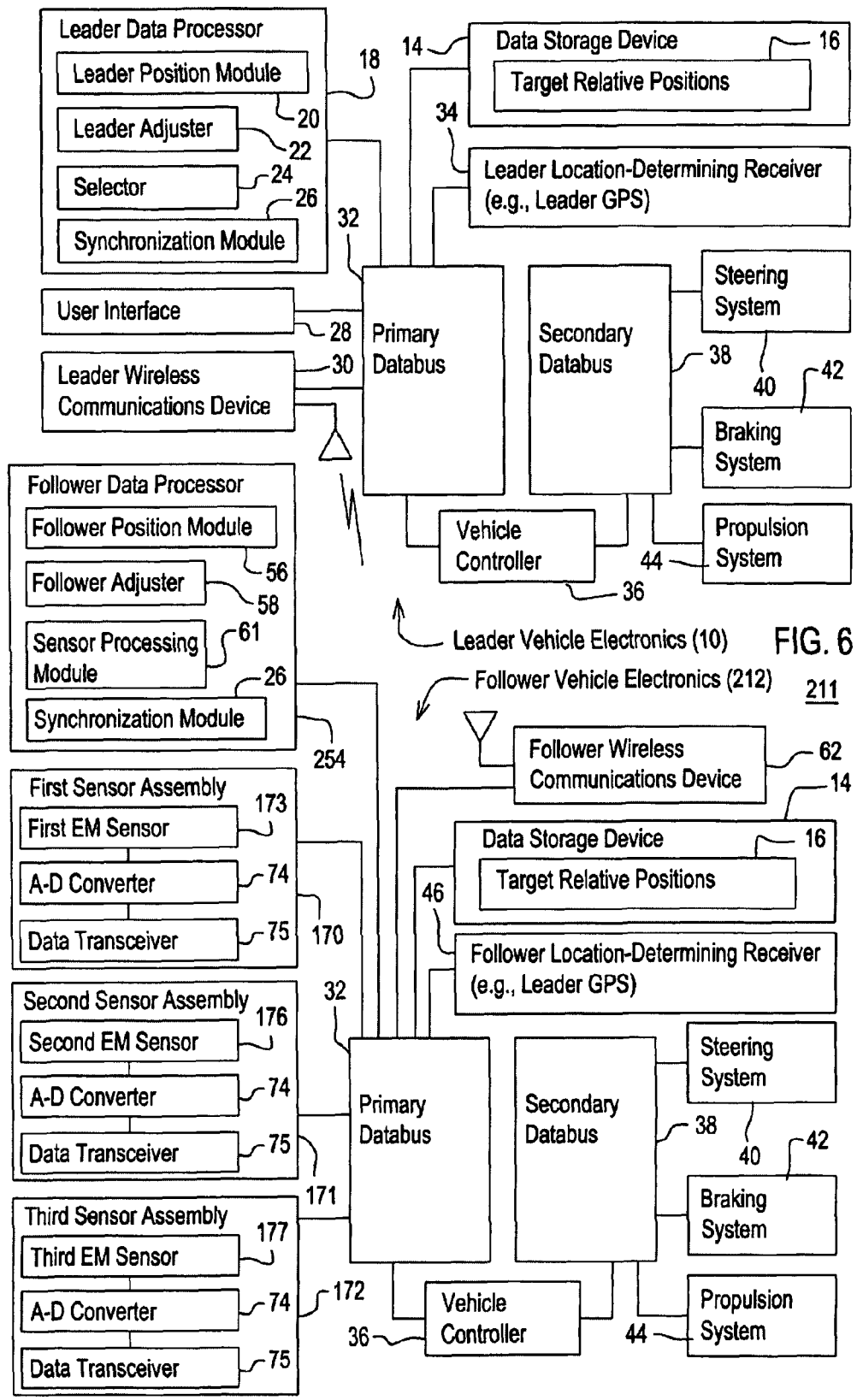
FIG. 6 is a block diagram of yet another embodiment of a system for controlling the loading of a container associated with a vehicle.

The weighing module 61 evaluates the sensor data (e.g., weight data or status message data) transmitted from one or more data transceivers 75 associated with different zones or volumes of the follower vehicle, or one or more containers associated with the follower vehicle (e.g., 405). As shown in FIG. 6, the sensor assemblies (70, 71 and 72) comprise a first sensor assembly 70 associated with a first zone or first volume (e.g., 406) of a container or containers of the follower vehicle; a second sensor assembly 71 associated with a second zone or second volume (e.g., 407) of the container or containers of the follower vehicle; and a third sensor assembly 72 associated with a third zone or third volume (e.g., 408) of the container or containers of the follower vehicle. For example, the first sensor assembly 70 provides a weight reading indicative of a level of material or fullness of the first zone or first volume 406; the second sensor assembly 71 provides a weight reading indicative of a level of material or fullness of the second zone or second volume 407; and the third sensor assembly 72 provides a weight reading indicative of a level of material or fullness of a third zone or third volume 408.

In a first example, if the weighing module 61 determines that a minimum threshold weight is met or exceeded in one zone or volume of the container, the follower adjuster 58 may shift one target position (e.g., first relative target position) of the follower vehicle with respect to the leader vehicle to another or next target, position (e.g., a second relative target position or a third relative target position). In a second example, the follower data processor 54 may transmit a signal from the follower vehicle wireless communications device 62 to the leader wireless communications device 30 such that the leader position module 20 or the leader adjuster 22 shifts the position of the leader vehicle (e.g., 400) with respect to the follower vehicle (e.g., 405), until the zones or volumes associated with the other positions are full to a desired degree or desired level of fullness. The desired level of fullness may be expressed as a percentage or fraction of the total capacity of any zone or volume, for instance. Regardless of which vehicle electronics (10, 12, 112 or 212) initiates the shift from the one target position to another target position, the shift is communicated to the other vehicle electronics via the wireless communication devices (30, 62). Further, the synchronization modules 26 may track such shifts to better coordinate maintaining appropriate relative positions of the vehicles (400, 405). If the weighing module 61 determines that all available zones or volumes of the container or the follower vehicle are full, the material sent via the chute may be disabled for a time period to allow another follower vehicle that has an empty container to engage with the leader vehicle in material collection and storage.

The system 211 of FIG. 6 is similar to the system 11 of FIG. 1, except the follower vehicle electronics 212 of FIG. 6 further comprises a first sensor assembly 170, a second sensor assembly 171 and a third sensor assembly 172 associated with a container or containers of the follower vehicle. In addition, the follower data processor 254 further comprises a sensor processing module 61.

Each sensor assembly (170, 171 and 172) comprises an electromagnetic sensor (e.g., an optical sensor or laser sensor) or EM sensor. The electromagnetic sensor (173, 176 or 177) may comprise a transceiver, the combination of an transmitter and a receiver, the combination of a laser transmitter and an optical or electromagnetic radiation detector (e.g., photodetector or cadmium sulfide cell) that operates within visible light spectrum, ultraviolet, infra-red, near infra-red, or another suitable range of the electromagnetic spectrum. Further, each sensor assembly (170, 171 and 172) may be associated with a passive optical reflector, a reflective surface, or a mirror that is spatially separated from the transmitter, light emitting source, laser or transceiver. For instance, the passive optical reflector, reflective surface or mirror may be located on an opposite side or portion of the container from the sensor assembly (170, 171 and 172) such that an optical path or electromagnetic path between the sensor assembly and the reflector, reflective surface or mirror intercepts, strikes or irradiates the material at or near a full level of the material, for each monitored volume, zone or monitored section of the container.

If the electromagnetic sensor (173, 176 or 177) provides an analog output, the electromagnetic sensor is coupled to an analog-to-digital converter 74 or A/D converter. In turn, the analog-to-digital converter 74 may be coupled to a data transceiver 75 that is capable of transmitting or receiving a data message to the follower data processor 54 or the sensor processing module 61 via the primary databus 32. A first sensor assembly 170 comprises a first electromagnetic sensor 173 coupled to an analog-to-digital converter 74, which is in turn coupled to a data transceiver 75. A second sensor assembly 171 comprises a second electromagnetic sensor 176 coupled to an analog-to-digital converter 74, which is in turn coupled to a data transceiver 75. A third sensor assembly 172 comprises a third electromagnetic sensor 177 coupled to an analog-to-digital converter 74, which is in turn coupled to a data transceiver 75.

If no reflection is received from a transmission of an electromagnetic signal or radiated light from an electromagnetic sensor (173, 176, or 177) toward the reflector, reflective surface or mirror, the electromagnetic sensor (173, 176 or 177) (e.g., a photo-detector portion thereof) may send a signal or status message to the sensor processing module 61 via the primary databus 32 that indicates the particular volume, zone or section of the container is full or full to a certain level associated with the transmitted beam of electromagnetic radiation. The sensor processing module 61 or follower data processor 254 evaluates signal data or status message data transmitted from one or more data transceivers 75 associated with different zones or volumes of the container or the follower vehicle. As shown in FIG. 6, the sensor assemblies (170, 171 and 172)-comprise a first sensor assembly 170 associated with a first zone or first volume (e.g., 406) of a container of the follower vehicle (e.g., 405); a second sensor assembly 171 associated with a second zone (e.g., 407) or second volume of the container of the follower vehicle; and a third sensor assembly 172 associated with a third zone (e.g., 408) or third volume of the container of the follower vehicle.

In one example, if the sensor processing module 61 determines that a reflection of an electromagnetic signal is not received at the sensor assembly (170, 171, or 172) in one zone or volume of the container, the follower adjuster 58 may shift the position of the follower vehicle (e.g., 405) with respect to the leader vehicle (e.g., 400). In another example, if the sensor processing module 61 determines that a reflection of an electromagnetic signal is not received at the sensor assembly (170, 171, or 172) in one-zone or volume of the container, the follower data processor 254 may transmit a signal from the follower vehicle wireless communications device 62 to the leader wireless communications device 30 such that the leader position module 20 or the leader adjuster 22 shifts the position of the leader vehicle (e.g., 400) with respect to the follower vehicle (e.g., 405), until the zones or volumes associated with the other positions are full to a desired degree. Regardless of which vehicle electronics (10, 12, 112, or 212) initiates the shift from the one target relative position to another target relative position, the shift is communicated to the other vehicle electronics via the wireless communication devices (30, 62). Further, the synchronization modules 26 may track such shifts to better coordinate maintaining appropriate relative positions (e.g., including angular bearing and distance, or lateral offset and direction of travel offset) of the vehicles. If the sensor processing module 61 or the follower data processor 254 determines that all available zones or volumes of the container or the follower vehicle are full or filled to a desired degree, the material sent via the chute may be disabled for a time period to allow another follower vehicle that has an empty container to engage with the leader vehicle (e.g., 400) in material collection and storage.

In one embodiment, the follower vehicle (e.g., 405) has at least two zones or volumes for storing the material. In one example, each zone may be associated with an electromagnetic sensor (e.g., optical sensor or 173, 176 or 177) that optically detects or electromagnetically detects a level of the stored material in the zone. The electromagnetic sensor (173, 176, or 177) may comprise an optical transmitter that transmits an optical, infra-red, near-infrared or laser signal from one side of the container toward an optically reflective member on an opposite side, opposite, diameter portion, or radially opposite portion, of the container. Further, the electromagnetic sensor (173, 176, or 177) comprises an optical receiver that is capable of receiving the reflection from the optically reflective member if the reflection is not attenuated or blocked by the presence of stored material in the zone or volume. Accordingly, the electromagnetic sensor (173, 176, or 177) may be configured to provide a zone status, signal or status data message (e.g., zone full message) to the selector 24 such that the selector 24 can switch to another zone that is not yet full.

Having described the preferred embodiment, it will become apparent that various modifications can be made without departing from the scope of the invention as defined in the accompanying claims.

The following is claimed:

1. A method for controlling the loading of a container associated with a vehicle, the method comprising:
   determining a leader location of a lead vehicle;
   determining a follower location of a follower vehicle having a container for storing a material;
   calculating an observed relative position between the lead vehicle and the follower vehicle;
   establishing target relative positions between the lead vehicle and the follower vehicle, where the target relative positions include at least a first target relative position and a second target relative position spatially separated form the first target relative position;
   selecting a preferential one of the established target positions; and wherein the first target relative position is expressed as a first distance ($D_1$) and a first angle ($\theta_1$) with respect to a leader reference point of the leader vehicle and a follower reference point of the follower vehicle; the first target relative position aligned such that a chute or conduit of the leader vehicle is aligned with a first volume or first zone of the container of the follower vehicle
   adjusting the observed relative position of the follower vehicle to achieve the selected preferential one of the established target positions.

2. The method according to claim 1 wherein the selecting comprises a user's manual selection of one or more preset positions as the target positions between the leader vehicle and the follower vehicle.

3. The method according to claim 1 wherein the selecting comprises maintaining a certain relative position between the vehicles for a corresponding maximum time period prior to shifting a next relative position between the vehicles.

4. The method according to claim 1 wherein the second target relative position is expressed as a second distance ($D_2$) and a second angle ($\theta_2$) with respect to a leader reference point of the leader vehicle and a follower reference point of the follower vehicle; the second target relative position aligned such that a chute or conduit of the leader vehicle is aligned with a second volume or second zone of the container of the follower vehicle.

5. The method according to claim 1 wherein the third target relative position is expressed as a third distance ($D_2$) and a third angle ($\theta_2$) with respect to a leader reference point of the leader vehicle and a follower reference point of the follower vehicle; the third target relative position aligned such that a chute or conduit of the leader vehicle is aligned with a third volume or second zone of the container of the follower vehicle.

6. The method according to claim 1 further comprising:
detecting a weight associated with a material stored or accumulated in a corresponding portion or zone of the container;
determining whether the weight or mass applied to the weight sensor reaches a threshold minimum weight; and
generating a signal or status message that the corresponding zone of the container is regarded as full with the material if the determined weight reaches or meets a threshold.

7. The method according to claim 4 further comprising:
shifting the position of the follower vehicle, with respect to the leader vehicle if the minimum threshold weight is exceeded in one zone or volume of the container until the zones or volumes associated with the other positions are full to a desired degree.

8. The method according to claim 1 further comprising:
transmitting an electromagnetic signal toward at least one of a reflector or reflective surface mounted in the container of the vehicle;
determining whether a reflection of the electromagnetic signal is not received for a minimum threshold time based on a material in a corresponding zone of the container blocking or attenuating the transmitted electromagnetic signal;
generating a signal or status message that the corresponding zone of the container is regarded as full with the material if the reflection is not received for the minimum threshold time.

9. The method according to claim 7 further comprising:
shifting a position of the follower vehicle with respect to the leader vehicle until the zones or volumes of the container associated with the other positions are full to a desired degree if the status signal indicates that the corresponding zone of the container is full.

10. The method according to claim 1 further comprising:
transmitting a signal from the follower vehicle to a leader vehicle such that the leader position module or the leader adjuster shifts the position of the leader vehicle with respect to the follower vehicle.

11. The method according to claim 1 wherein the leader vehicle comprises a combine and wherein the follower vehicle comprises a grain cart, and wherein the material comprises harvested grain.

12. A system for controlling the loading of a container associated with a vehicle, the system comprising:
a leader location-determining receiver for determining a leader location of a lead vehicle;
a follower location-determining receiver for determining a follower location of a follower vehicle having a container for storing a material;
a position module for calculating an observed relative position between the lead vehicle and the follower vehicle;
a data processor for establishing target relative positions between the load vehicle and the follower vehicle, where the target relative positions include at least a first target relative position and a second target relative position spatially separated from the first target relative position;
a selector for selecting a preferential one of the established target positions; and wherein the first target relative position is expressed as a first distance ($D_1$) and a first angle ($\theta_1$) with respect to a leader reference point of the leader vehicle and a follower reference point of the follower vehicle; the first target relative position aligned such that a chute or conduit of the leader vehicle is aligned with a first volume or first zone of the container of the follower vehicle
an adjuster for adjusting the observed relative position of the follower vehicle to achieve the selected preferential one of the established target positions.

13. The system according to claim 12 wherein the selector supports a user's manual selection of one or more preset positions as the target positions between the leader vehicle and the follower vehicle.

14. The system according to claim 12 wherein the selector facilitates selecting and maintaining a certain relative position between the vehicles for a corresponding maximum time period prior to shifting a next relative position between the vehicles.

15. The system according to claim 12 wherein the second target relative position is expressed as a second distance ($D_2$) and a second angle ($\theta_2$) with respect to a leader reference point of the leader vehicle and a follower reference point of the follower vehicle; the second target relative position aligned such that a chute or conduit of the leader vehicle is aligned with a second volume or second zone of the container of the follower vehicle.

16. The method according to claim 12 wherein the third target relative position is expressed as a third distance ($D_2$) and a third angle ($\theta_2$) with respect to a leader reference point of the leader vehicle and a follower reference point of the follower vehicle; the third target relative position aligned such that a chute or conduit of the leader vehicle is aligned with a third volume or second zone of the container of the follower vehicle.

17. The system according to claim 12 further comprising:
a weight sensor associated with a material stored or accumulated in a corresponding portion or zone of the container;
a weighing module for determining whether the weight or mass applied to the weight sensor reaches a threshold minimum weight; the weighting module arranged to generate a signal or status message that the corresponding zone of the container is regarded as full with the material if the determined weight reaches or meets a threshold.

18. The system according to claim 17 further comprising:
a follower adjuster for shifting the position of the follower vehicle with respect to the leader vehicle if the minimum threshold weight is exceeded in one zone or volume of the container until the zones or volumes associated with the other positions are full to a desired degree.

19. The system according to claim 12 further comprising:
a reflector or reflective surface of a container of the vehicle;
a transmitter for transmitting an electromagnetic signal toward at least one of the reflector or the reflective surface;
a receiver for determining whether a reflection of the electromagnetic signal is not received for a minimum threshold time based on a material in a corresponding zone of the container blocking or attenuating the transmitted electromagnetic signal; and a sensor processing module for generating a signal or status message that the corresponding zone of the container is regarded as full with the material if the reflection is not received for the minimum threshold time.

20. The system according to claim 19 further comprising:
a follower adjuster shifting a position of the follower vehicle with respect to the leader vehicle until the zones or volumes of the container associated with the other positions are full to a desired degree if the status signal indicates that the corresponding zone of the container is full.

21. The system according to claim 12 further comprising:
a wireless communications device for transmitting a signal from the follower vehicle to a leader vehicle such that the leader position module or the leader adjuster shifts the position of the leader vehicle with respect to the follower vehicle.

22. The system according to claim 12 wherein the leader vehicle comprises a combine and wherein the follower vehicle comprises a grain cart, and wherein the material comprises harvested grain.

* * * * *